United States Patent
Kivits et al.

(10) Patent No.: US 8,045,439 B1
(45) Date of Patent: Oct. 25, 2011

(54) SYSTEM AND METHOD FOR STORING DATA TO AN OPTICAL RECORDING DEVICE

(75) Inventors: Peter J. Kivits, Waalre (NL); Jeroen Dorgelo, Eindhoven (NL)

(73) Assignee: Marvell International Ltd., Hamilton (BM)

( * ) Notice: Subject to any disclaimer, the term of this patent is extended or adjusted under 35 U.S.C. 154(b) by 333 days.

(21) Appl. No.: 12/349,715

(22) Filed: Jan. 7, 2009

Related U.S. Application Data (60) Provisional application No. 61/022,635, filed on Jan. 22, 2008, provisional application No. 61/036,268, filed on Mar. 13, 2008.

(51) Int. Cl.
*G11B 7/0045* (2006.01)
(52) U.S. Cl. .................................. 369/59.12; 369/59.11
(58) Field of Classification Search ................... None
See application file for complete search history.

(56) References Cited

U.S. PATENT DOCUMENTS

| | | | |
|---|---|---|---|
| 2002/0105873 A1* | 8/2002 | Watanabe et al. | 369/47.51 |
| 2002/0159349 A1 | 10/2002 | Katayama | |
| 2004/0022151 A1* | 2/2004 | Furumiya et al. | 369/47.53 |
| 2007/0109938 A1 | 5/2007 | Shirota et al. | |
| 2007/0127341 A1* | 6/2007 | Sagara et al. | 369/59.11 |
| 2007/0165506 A1* | 7/2007 | Nakamura et al. | 369/59.11 |
| 2007/0206475 A1* | 9/2007 | Tamaki et al. | 369/59.12 |
| 2007/0223340 A1* | 9/2007 | Shirota et al. | 369/59.11 |
| 2008/0094991 A1* | 4/2008 | Minemura | 369/100 |

OTHER PUBLICATIONS

Standard ECMA-267, 3rd Edition—Apr. 2001; ECMA Standardizing Information and Communication Systems; 120 mm DVD—Read-Only Disk; 91 pages.
"Modeling and Compensation of Asymmetry in Optical Recording"; Haralampos Pozidis, Member, IEEE, Jan W.M. Bergmans, Senior Member, IEEE, and Wim M.J. Coene; IEEE Transactions on Communications, vol. 50, No. 12; Dec. 2002; pp. 2052-2063.
"A Simple Nonlinear Model for the Optical Recording Channel" Haralampos Pozidis, Wim M.J. Coene, Jan W.M. Bergmans; Philips Research Laboratories; Jan. 10, 2001; 5 pages.
"Adaptive Asymmetry Corrector" Chris Painer; Jul. 15, 2009; 5 pages.

* cited by examiner

*Primary Examiner* — Lixi C Simpson (57) ABSTRACT

A system includes an encoding module and a laser driver module. The encoding module is configured to encode a data stream. The laser driver module is configured to convert the encoded data stream into a write signal including one or more edges. The write signal is output to an optical writer. The laser driver module is configured to adjust an actual position at which the optical writer writes a first edge of the one or more edges on an optical storage medium away from a desired position for the first edge. The adjustment is made based on (i) a first preceding edge position, (ii) a first following edge position, (iii) a second preceding edge position or a second following edge position, and (iv) a third preceding edge position or a third following edge position. The first edge corresponds to a beginning of a mark edge of the write signal.

19 Claims, 10 Drawing Sheets

SYSTEM AND METHOD FOR STORING DATA TO AN OPTICAL RECORDING DEVICE

CROSS-REFERENCE TO RELATED APPLICATIONS

This application claims the benefit of U.S. Provisional Application Nos. 61/022,635, filed on Jan. 22, 2008 and 61/036,268 filed on Mar. 13, 2008. The disclosures of the above applications are incorporated herein by reference in their entirety.

FIELD

The subject matter of the present disclosure relates generally to optical data storage, and more particularly to systems and methods for storing data on an optical storage medium.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Optical recording devices are used to record information, such as music, movies, pictures, data, etc., on recordable media. Examples of recordable media are compact discs (CDs), digital versatile discs (DVDs), high density/high definition DVDs and Blu-ray Discs (BDs). In order to record information onto recordable media, a recording device typically tracks the location of a laser beam on the recordable media.

Figure 1A:
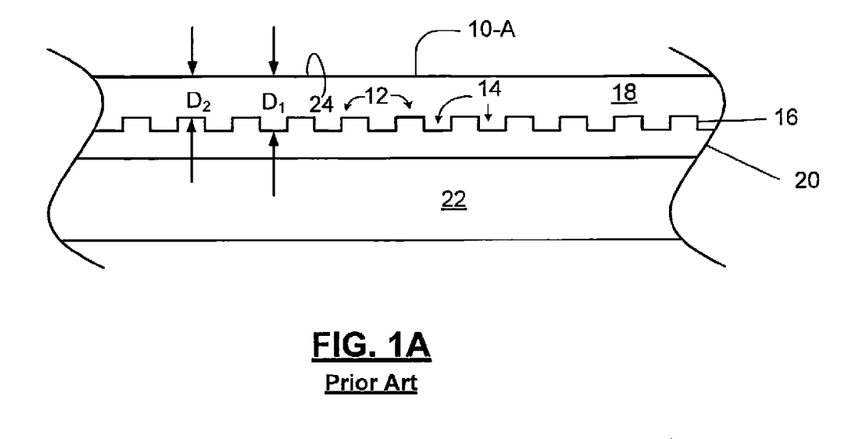
FIGS. 1A-1B are partial cross-sectional views of recording mediums according to the prior art.
Figure 1B:
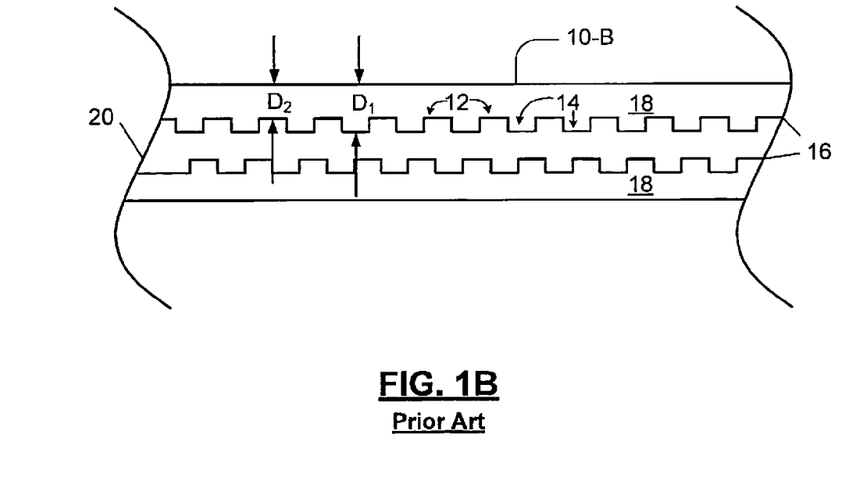

FIGS. 1A-1B respectively illustrate partial cross-sectional views of examples of recordable mediums 10-A, 10-B. The recordable mediums 10-A, 10-B have lands 12 and grooves 14, which are formed on one or more recording layers 16 of one or more main substrates 18. The main substrates 18 may be adhered via an adhesive layer 20 to dummy substrates 22, as shown.

The lands 12 and grooves 14 refer to physical structures of the recording layer 16 that are adjacent each other but that have different associated depths. For example, the grooves 14 have a greater associated depth than the lands 12. Sample land depths $D_1$ and sample groove depths $D_2$ are shown. The depths may be measured relative to a disk outer surface 24 and are equal to a fraction of an optical wavelength of a laser beam. The lands 12 and grooves 14 provide servo information for positioning of a laser beam spot on a disc. The lands 12 and grooves 14 also provide reflected beam signal modulation that is detected and used for tracking.

Standards, such as DVD+/−R and DVD+/−RW, require recording only over grooves. An alternative standard, referred to as DVD-RAM, requires recording over both land and groove structures. In DVD+/−R and DVD+/−RW recording, the lands 12 and grooves 14 typically form a continuous spiral. In DVD-RAM recording, the lands 12 alternate with the grooves 14 to form a continuous spiral.

Figure 2:
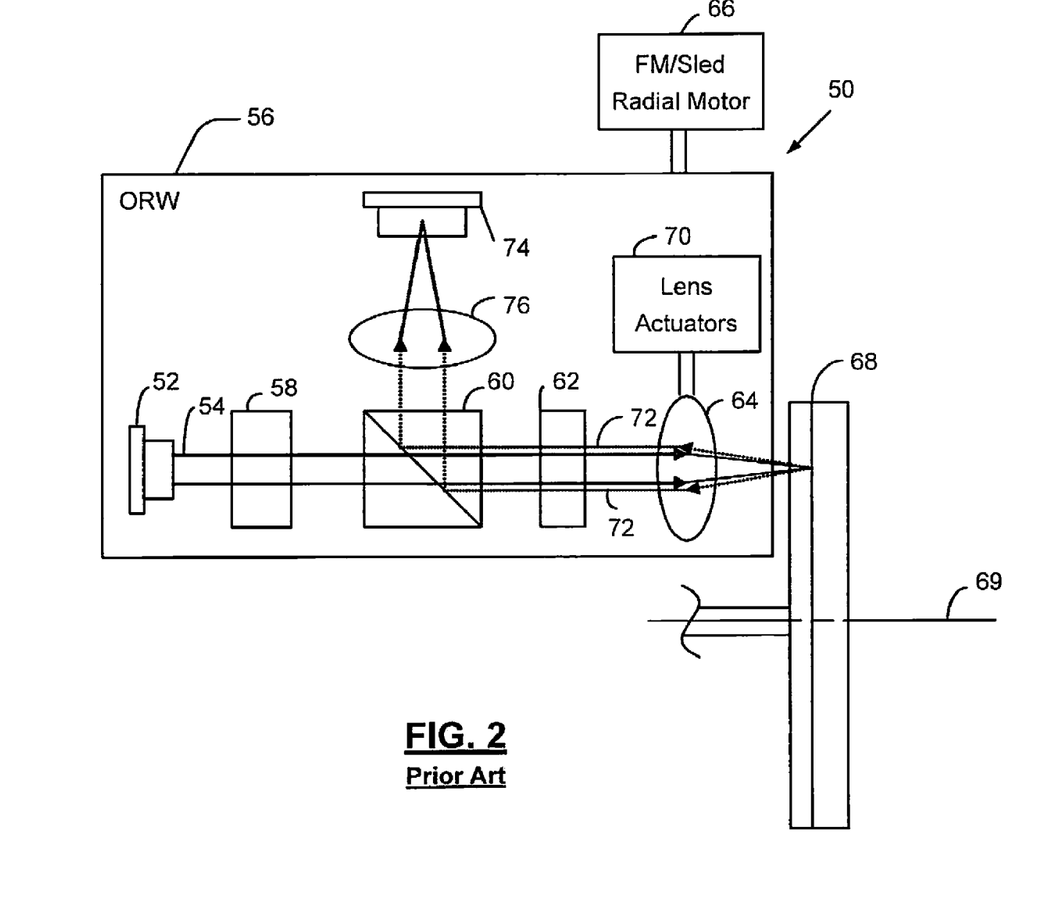
FIG. 2 is a functional block diagram of an optical drive system according to the prior art.

FIG. 2 illustrates a conventional optical DVD drive system 50. The optical DVD drive system 50 includes a laser source 52, such as a laser diode, that emits a laser beam 54. The laser source 52 may be part of an optical read/write assembly (ORW) 56. The ORW 56 includes a collimator lens 58, a polarizing beam splitter 60, a quarter wave plate 62, and an objective lens 64. The laser beam 54 is collimated by the collimator lens 58 and passed through the polarizing beam splitter 60. The laser beam 54 is received by the quarter wave plate 62 from the beam splitter 60 and is focused via the objective lens 64. The laser beam 54 may be radially displaced across tracks of the optical storage medium 68 through movement of the ORW 56 via a sled motor 66. The laser beam 54 is moved while the optical storage medium 68 is rotated about a spindle axis 69. The laser beam 54 is shaped and focused to form a spot over the land/groove structures of an optical storage medium 68 via lens actuators 70.

The light from the laser beam 54 reflects off the optical storage medium 68 and is thus directed back into the ORW 56. The reflected light, represented by dashed line 72, is redirected by the beam splitter 60. An astigmatic focus lens 76 focuses the reflected light into a spot over a photo-detector integrated circuit (PDIC) 74. Although not shown, additional photo-detectors may be used to detect other diffracted light beams, which are also not shown.

Figure 3:
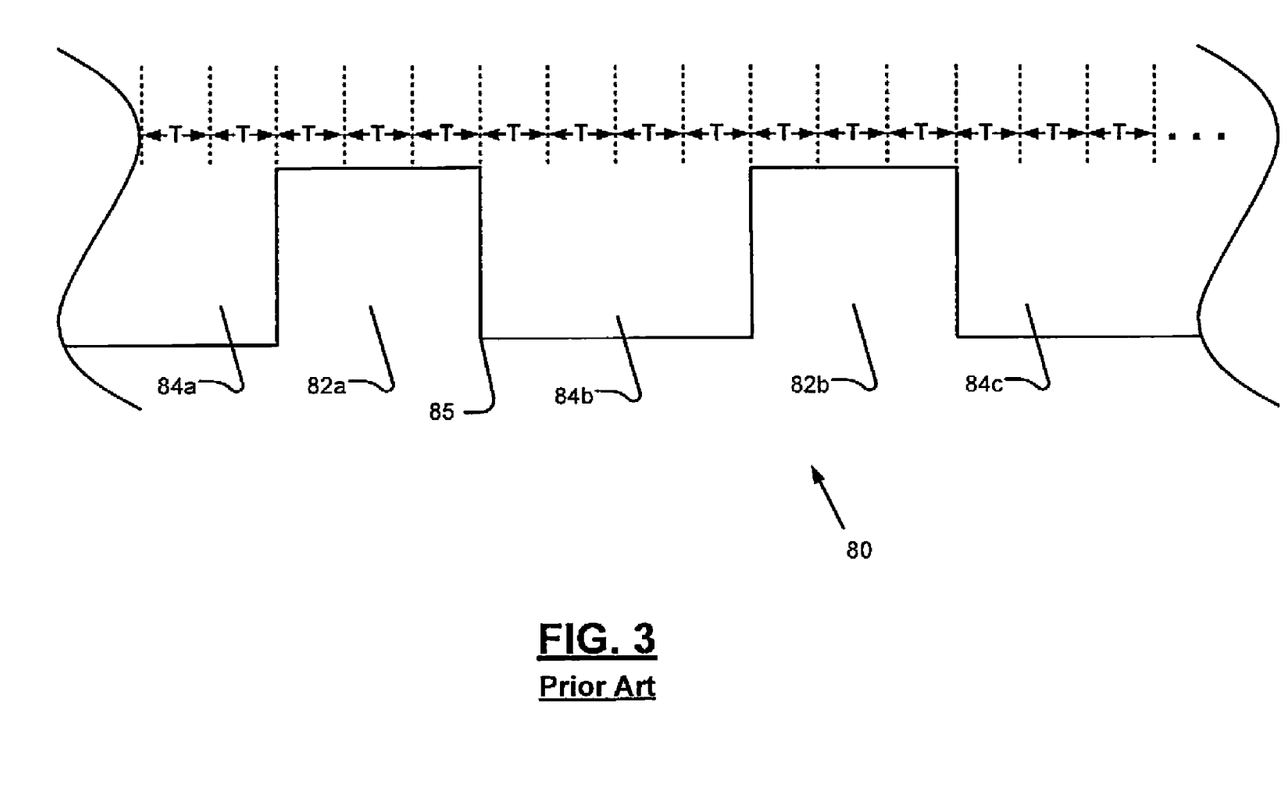
FIG. 3 is an exemplary bit-stream of write channel data.

Referring now to FIG. 3, an exemplary bit-stream of write channel data is presented. Data that is to be written to optical storage media may first be encoded using techniques such as cyclic redundancy check (CRC), error-correcting code (ECC), Reed-Solomon coding, and/or interleaving. Alternatively, 8-to-14 modulation (EFM) may be used to encode the data to be stored on an optical storage medium. The encoded data stream may then be sent to a laser driver unit, which converts the data stream into a series of electrical pulses that are used to record the data onto the optical storage medium.

An exemplary channel bit-stream is represented as waveform 80. The waveform 80 contains one bit for every time period (T). The interval where the waveform 80 is high may be referred to as a space 82a, 82b. The intervals where the waveform 80 is low may be referred to as marks 84a-84c. Marks may be represented on the optical storage media as areas of low reflectivity (pits), amorphous domains, or any other type of form that can be sensed by the optical system. Spaces may be represented as areas of high reflectivity between marks. These reflectivities may be created by a laser beam, as is known in the art.

A typical optical reader, for example a DVD player, has a light spot that is approximately 9T wide. In other words, a typical optical reader detects the reflectivity of an area on the optical storage medium that is nine time periods long. Thus, marks or spaces of a length less than 9T may be difficult to distinguish from adjacent spaces or marks. In most encoding schemes, optical readers are generally designed to detect edges of a waveform (e.g., edges 85 of waveform 80) in order to decode the data therein.

Depending on the parameters of the optical storage media, and the binary encoding scheme employed, the length of marks and spaces may be constrained. For example, in the EFM encoding technique, the smallest length of a mark or space is 3T and the longest length of a mark or space is 11T. A laser driver, based on the information in the data stream, determines the correct power and time duration for operating a laser to create marks (e.g., marks 84a-84c). These marks 84a-84c, in combination with spaces 82a, 82b, are then detected or read by an optical reader. The goal of the laser driver is to create marks and spaces such that the optical reader will detect the stored data correctly. In accordance with this goal, a laser driver typically includes a translation module, such as a laser table, that dictates how data is to be stored on an optical storage medium.

Among other functions, a laser table will direct the laser driver to position a mark based on the immediately preceding space length and the length of the mark to be written. Thus, the actual physical beginning of a mark edge 85 may need to be adjusted from a desired position (that is, the position corresponding substantially to the intended data stream) in order for the position that is detected to correspond with the desired position of the signal to be stored. In other words, the optical reader will detect an edge 85 in a position that may not correspond to the actual physical position of the edge as written on the optical storage medium. This phenomenon is referred to as inter-symbol interference or ISI and causes the waveform that is output from the optical reader to differ from the physical marks and spaces that are stored on the optical storage medium. ISI contributes to jitter and other causes of error in data retrieval.

SUMMARY

In various embodiments, the present disclosure is directed to a driver for an optical storage medium. The driver comprises a converting module and an adjustment module. The converting module converts an encoded data stream into a write signal including one or more edges. The write signal is output to an optical writer. The adjustment module adjusts an actual position that the optical writer writes a first edge of the one or more edges on the optical storage medium away from a desired position for the first edge. The adjustment is based on a first preceding edge position, a first following edge position, and at least one of a second preceding edge position and a second following edge position. The adjustment is made such that a sensed position of the first edge on the optical storage medium as sensed by an optical reader corresponds to the desired position for the first edge.

In various embodiments, the adjustment module comprises a look-up table that stores one or more adjustment values and the adjustment module adjusts the actual position using an adjustment value stored in the look-up table.

In various embodiments, the adjustment module further adjusts the actual position that the optical writer writes the first edge on the optical storage medium based on inter-symbol interference of adjacent spaces and marks of the encoded data stream.

In various embodiments, the desired position for the first edge corresponds to a transition point in the encoded data stream.

In various embodiments of the disclosure, the present disclosure is directed to a method for writing to an optical storage medium. The method comprises converting an encoded data stream into a write signal including one or more edges, the write signal being output to an optical writer. The method further comprises adjusting an actual position that the optical writer writes a first edge of the one or more edges on the optical storage medium away from a desired position for the first edge. In some embodiments, the adjustment is made based on a first preceding edge position, a first following edge position, and at least one of a second preceding edge position and a second following edge position. In some embodiments, a sensed position of the first edge on the optical storage medium as sensed by an optical reader corresponds to the desired position for the first edge.

In various embodiments, the adjustment of the actual position that the optical writer writes the first edge on the optical storage medium is based on an adjustment value stored in a look-up table.

In various embodiments, the adjustment of the actual position that the optical writer writes the first edge on the optical storage medium is based on inter-symbol interference of adjacent spaces and marks of the encoded data stream.

In various embodiments, the desired position for the first edge corresponds to a transition point in the encoded data stream.

Further areas of applicability of the present disclosure will become apparent from the detailed description provided hereinafter. The detailed description and specific examples, while indicating various embodiments of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

As used herein, the phrase at least one of A, B, and C should be construed to mean a logical (A or B or C), using a non-exclusive logical or. A software module or module that is software based may refer to a set or series of software code, which are used to perform one or more tasks. It should be understood that steps within a method may be executed in different order without altering the principles of the present disclosure.

The present disclosure is directed to a system and method of writing to an optical disk that compensates for inter-symbol interference by adjusting the position of an edge between spaces and marks of an optical storage medium. An optical read/write system detects (or "reads") the data stored on the optical storage medium by detecting light (e.g., from a laser beam) that is reflected from the spaces and marks of the optical storage medium. The light that is reflected from the optical storage medium may comprise a compilation of the reflections from a number of periods, or T's, of the signal and ISI may cause the detected edges to "shift" from the true physical position of the edges on the medium. Thus, it is desirable to store the data on the optical storage medium such that the optical read/write system will detect the transition points or edges of the signal at appropriate points, even if the actual stored position differs from the position that the data dictates. In other words, the optical storage medium will be written such that the optical reader will detect edges or transition points of the signal at the desired position, even if this means that the actual physical location of an edge of a mark or space differs from the desired physical position of the edge as detected.

Figure 4:
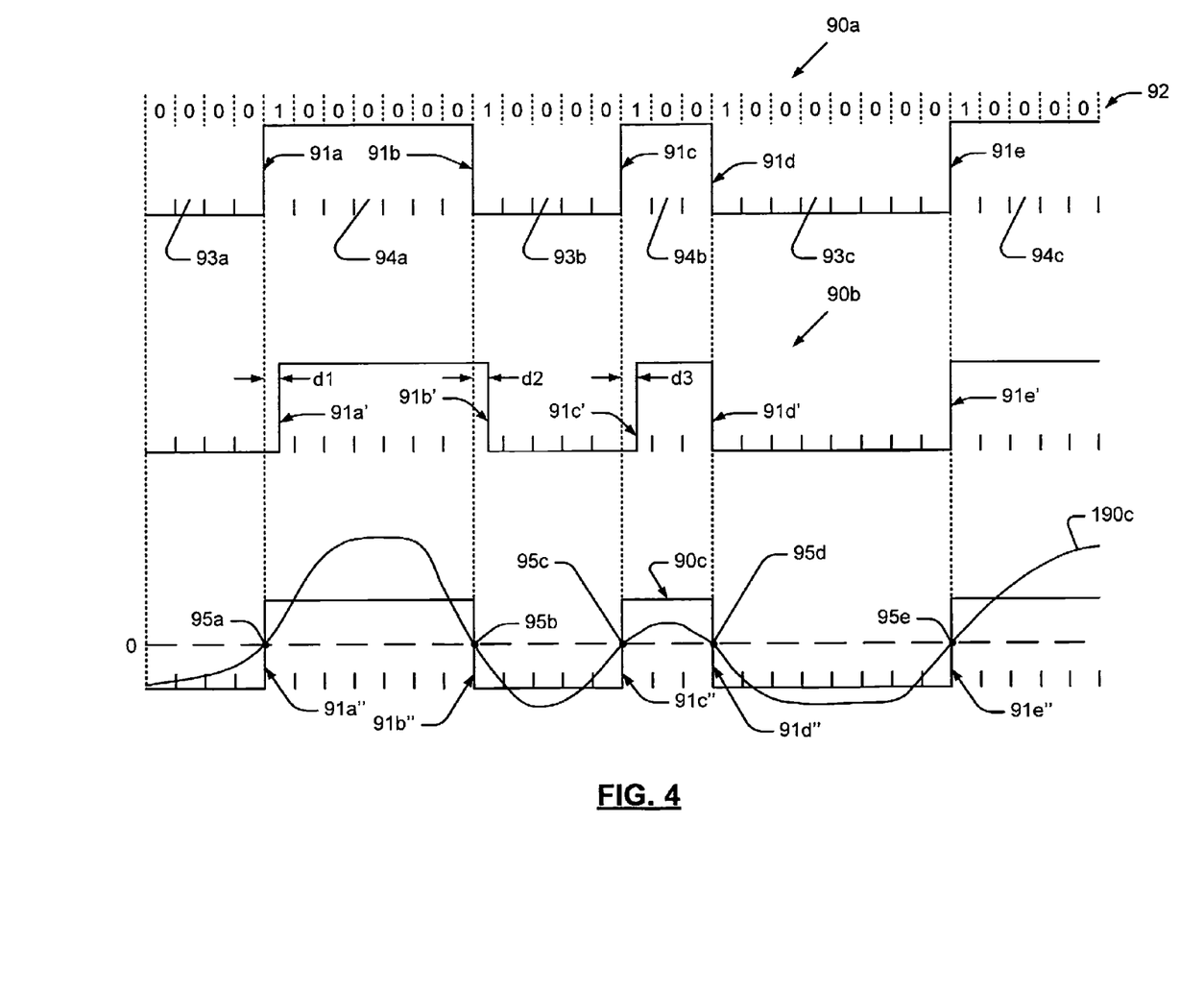
FIG. 4 is an exemplary bit-stream of write channel data, adjusted write channel data and read channel data.

FIG. 4 illustrates exemplary waveforms 90a-90c. Waveform 90a corresponds to a signal to be stored on an optical storage medium. For example in an EFM scheme, transition points (from high to low or low to high) or edges 91 are indicative of a one in a binary data stream while periods in which there is no transition are indicative of a zero. Thus, signal 90a corresponds to a binary data stream 92. The binary data stream 92 is the information that the optical read/write system is to write on the optical storage medium. The limitations of the optical read/write system, such as ISI, may require that the marks 93a-93c and spaces 94a-94c be stored on the optical storage medium in positions other than dictated by edges 91a-91e in order for the data to be detected correctly.

Waveform 90b comprises the actual spaces and marks to be written on the optical storage medium. Waveforms 90a and 90b differ from each other by adjustments d1-d3. Adjustments d1-d3 comprise variations in the actual physical position of the edges or transition points 91a-91e to be written on the optical storage medium. Adjustments d1-d3 are determined such that the optical read/write system will detect the edges 91a' through 91e' to be at the position dictated by edges 91a-91e of the desired waveform 90a.

Waveform 190c comprises the actual reflected light signal detected from the optical storage medium based on the stored waveform 90b, while waveform 90c comprises the square waveform corresponding to waveform 190c. Waveforms 90c and 190c are related in that whenever a zero crossing 95a-95e of waveform 190c is detected by the optical read/write system, a transition of square waveform 90c is determined. Adjustments d1-d3 are designed such that the zero crossings 95a-95e of waveform 190c correspond to the location of edges 91a-91e of waveform 90a. In this manner, the optical read/write system is able to reconstruct waveform 90a in waveform 90c more accurately. Thus, even though the actual edges of spaces and marks of waveform 90b are stored on the optical storage medium in physical locations 91a'-91e' that differ from the position of edges 91a-91e of waveform 90a, the detected waveform 90c corresponds to the binary data stream 92.

Figure 5:
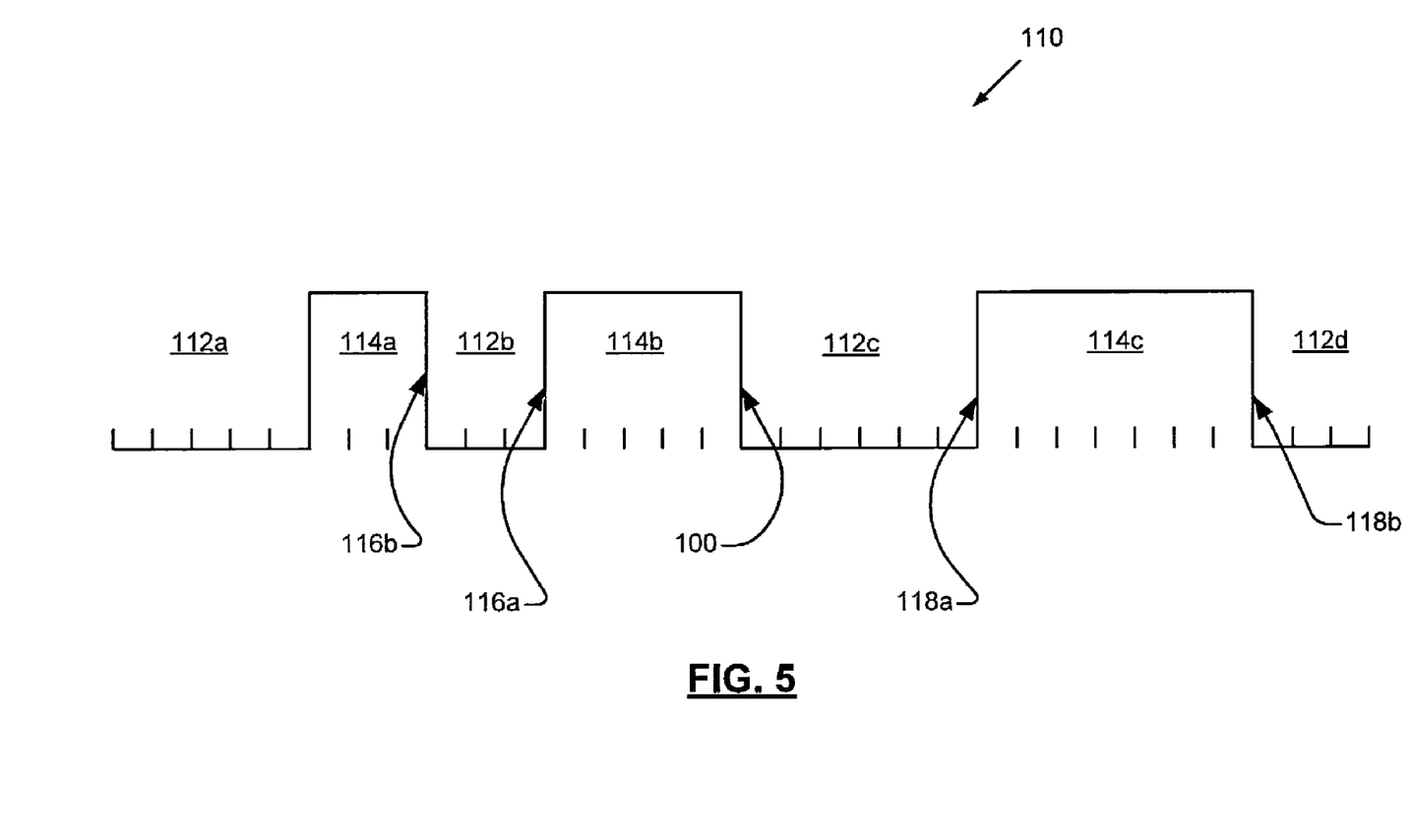
FIG. 5 is an exemplary bit-stream of write channel data.

The adjustments between the data signal to be stored on the optical storage medium and the actual data stream stored thereon may be determined as follows. Referring now to FIG. 5, the position of edge 100 of waveform 110 when detected by an optical reader may be dependent on adjacent spaces and marks. As described above, marks 112a-112d are formed by forming a pit within the optical storage medium. The length of the spaces 114a-114c and marks 112a-112d are determined by the placement of the edges or transition points between the spaces 114a-114c and marks 112a-112d.

The sense position of edge 100 may be dependent upon the length of adjacent space 114b and adjacent mark 112c, as well as adjacent mark 112b and adjacent space 114c. The transition between adjacent mark 112b and adjacent space 114b is referred to as edge 116a, which may also be referred to as the first preceding edge of edge 100. The edge between space 114a and mark 112b may be referred to as the second preceding edge 116b. Similarly, the edge between mark 112c and space 114c is first following edge 118a, while the edge 118b between space 114c and mark 112d may be referred to as second following edge 118b. The length of marks 112b and 112c and spaces 114b and 114c will affect the detection of edge 100 by the optical read/write system. Thus, the position of edges 116a, 116b, 118a and 118b will affect the position of edge 100 when detected by the optical read/write system.

As stated above, the laser beam utilized by the optical read/write system in a standard DVD reader is typically 9T long, where T refers to the period or bit length described above. Thus, an optical read/write system that is attempting to detect edge 100 may also detect a partial reflection from symbols adjacent thereto. This phenomenon becomes more pronounced for marks and spaces of short length. Thus, edges 116b and 116a may need more adjustment than edges 118a and 118b of FIG. 5.

Figure 6:
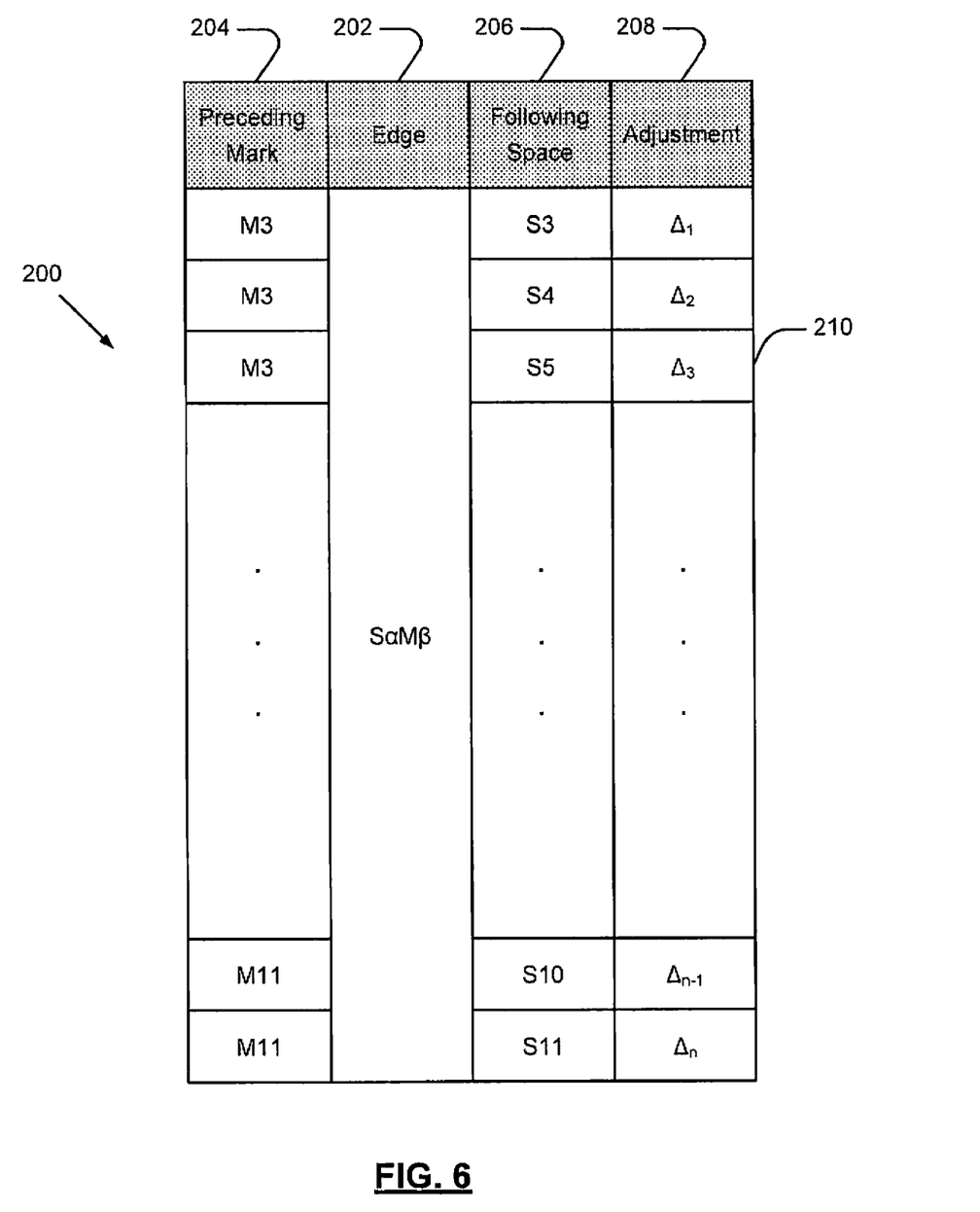
FIG. 6 is an exemplary depiction of the contents of a look-up table according to various embodiments of the present disclosure.

Referring now to FIG. 6, an exemplary laser table 200 is illustrated. Laser table 200 corresponds to and includes adjustments necessary for writing an edge S$\alpha$M$\beta$ in column 202, which is the edge between a space "S" of a periods and mark "M" of $\beta$ periods. Column 204 of laser table 200 comprises the length of the mark preceding the edge S$\alpha$M$\beta$ at issue. Column 206 comprises the list of potential space lengths following the edge S$\alpha$M$\beta$. Column 208 comprises adjustment values $\Delta_1$ to $\Delta_n$ corresponding to each of the entries in laser table 200. As an example only, laser table 200 dictates that the edge S$\alpha$M$\beta$ will be adjusted by $\Delta_3$ in the event that the preceding mark is three periods long and the space following S$\alpha$M$\beta$ is five periods long, seen at row 210.

It should be noted that laser table 200 may contain rows or adjustments $\Delta_1$ to $\Delta_n$ in the event that the edge to be written indicated in column 202 actually needs to be adjusted. In the event that a preceding mark of a certain length in conjunction with a following space of a sufficient length will not require an adjustment to edge S$\alpha$M$\beta$, laser table 200 may not include an entry corresponding thereto.

Laser table 200 may be replicated for each edge that is expected to be written. In the event that the edge to be written is a transition from a mark to a space, in contrast to the edge in laser table 200 that corresponds to a transition from a space to a mark, column 204 will correspond to the preceding space length and column 206 will correspond to the following mark length. The adjustment factors may be determined, for example, by laboratory testing or simulation or other process. It should be noted that laser table 200 corresponds to a data signal that has been encoded using EFM, which dictates that the minimum length of a space or a mark is three periods long and the maximum length of a space or mark is eleven periods long. In the event that another modulation method is used, the laser table may include more or less entries. Furthermore, laser table 200 includes adjustments relating for an edge only based on the two preceding and two following edges. In some implementations, a more comprehensive laser table may be constructed in which additional adjacent edges are considered and adjustments provided.

Figure 7:
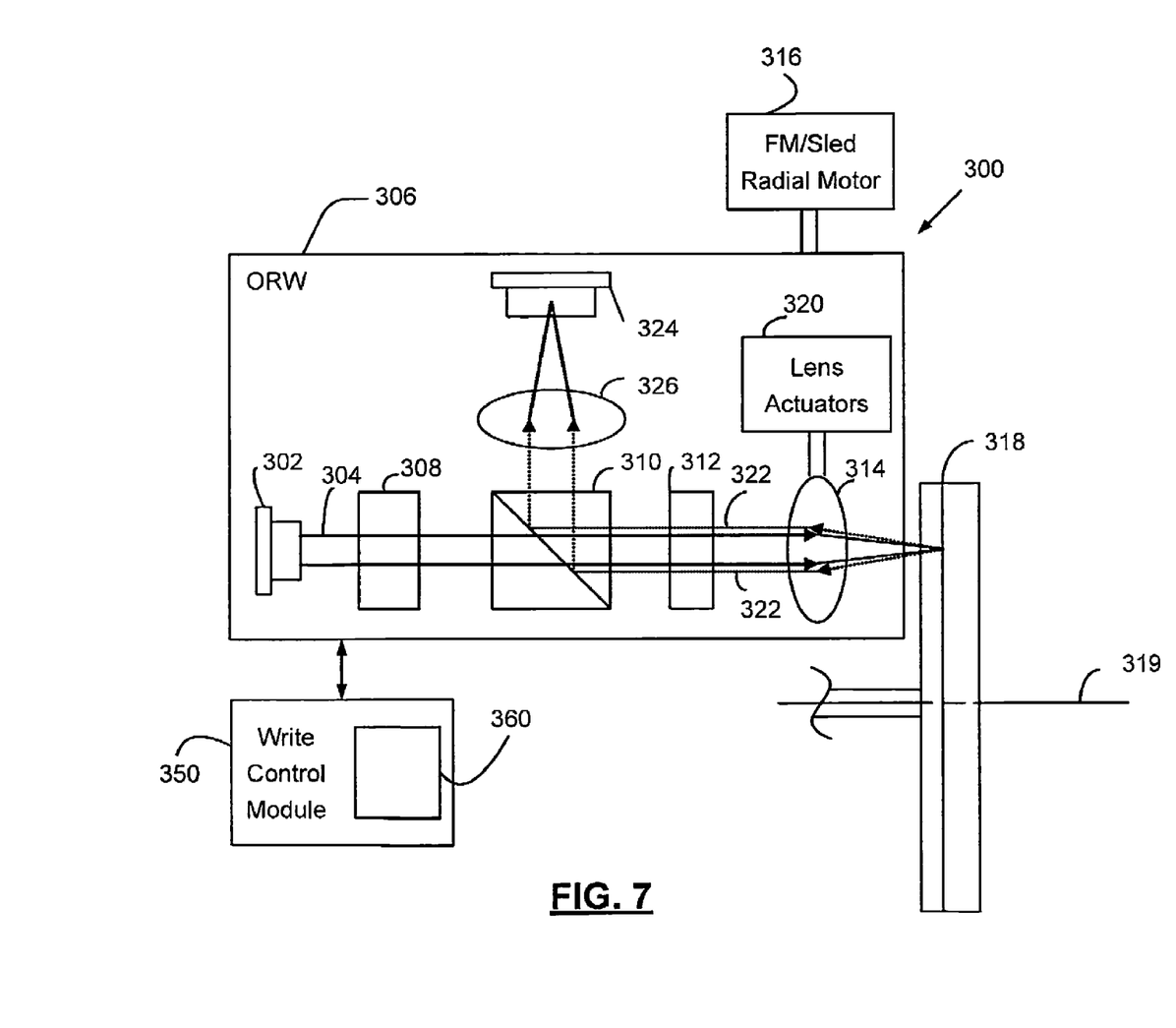
FIG. 7 is a functional block diagram of an optical drive system and write control module according to various embodiments of the present disclosure.

FIG. 7 illustrates an optical DVD drive system 300 according to various embodiments of the present disclosure. The system 300 includes a laser source 302, such as a laser diode, that emits a laser beam 304. The laser source 302 may be part of an optical read/write assembly (ORW) 306. The ORW 306 includes a collimator lens 308, a polarizing beam splitter 310, a quarter wave plate 312, and an objective lens 314. The laser beam 304 is collimated by the collimator lens 308 and passed through the polarizing beam splitter 310. The laser beam 304 is received by the quarter wave plate 312 from the beam splitter 310 and is focused via the objective lens 314. The laser beam 304 may be radially displaced across tracks of the optical storage medium 318 through movement of the ORW 306 via a sled motor 316. The laser beam 304 is moved while the optical storage medium 318 is rotated about a spindle axis 319. The laser beam 304 is shaped and focused to form a spot over the land/groove structures of an optical storage medium 318 via lens actuators 320.

The light from the laser beam 304 reflects off the optical storage medium 318 and is thus directed back into the ORW 306. The reflected light, represented by dashed line 322, is redirected by the beam splitter 310. An astigmatic focus lens 326 focuses the reflected light into a spot over a photo-detector integrated circuit (PDIC) 324. Although not shown, additional photo-detectors may be used to detect other diffracted light beams, which are also not shown.

DVD system 300 further comprises a write control module 350 coupled to ORW 306. In the illustrated embodiment, write control module 350 comprises a separate module from the ORW 300, but one can appreciate that the write control module 350 and ORW 300 may be combined into one module (not illustrated). Write control module 350 may include a laser table 360. Laser table 360 may be similar to laser table 200 described above and illustrated in FIG. 6. The write control module 300 directs the ORW 306 to record the appropriate spaces and marks on optical storage medium 318.

Figure 8:
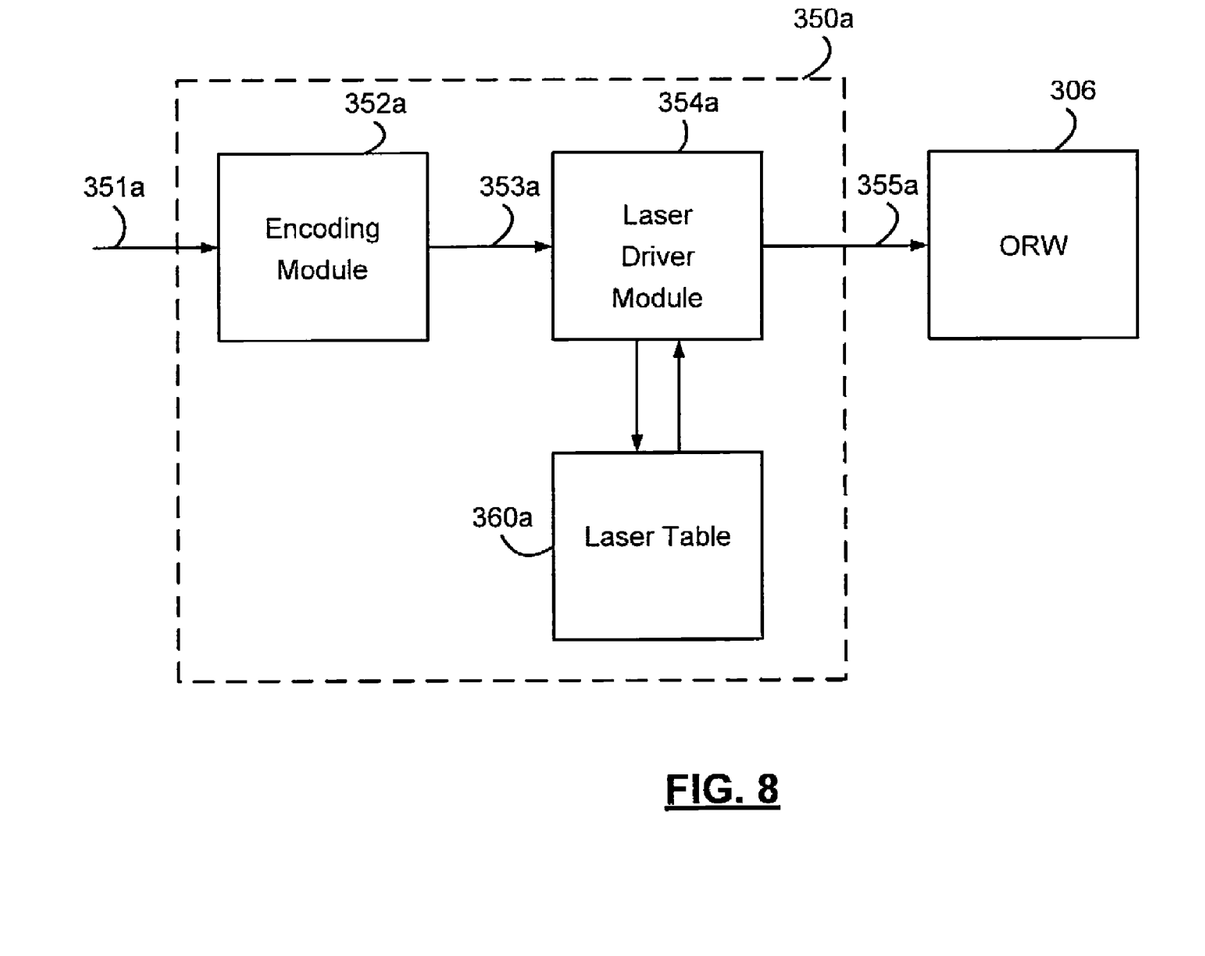
FIG. 8 is a functional block diagram of a write control module according to various embodiments of the present disclosure.

FIG. 8 illustrates an exemplary write control module 350a according to some embodiments of the present disclosure. Write control module 350a comprises encoding module 352a, laser driver module 354a and laser table 360a, and is coupled to ORW 306. Encoding module 352a receives a data stream 351a to be encoded, e.g., by cyclic redundancy check (CRC), error-correcting code (ECC), Reed-Solomon coding, 8-to-14 modulation (EFM), and/or interleaving. Encoding module 352a outputs an encoded data stream 353a to laser driver module 354a, which converts the encoded data stream into a write signal comprising a series of electrical pulses 355a that are used by ORW 306 to record the data onto the optical storage medium. Laser driver module 354a may utilize laser table 360a to adjust the position of the edges of the spaces and marks to be written, as described above. According to some embodiments of the present invention, the laser driver module 354a adjusts the position of an edge to be written based on the two preceding and two following edge positions. In these embodiments, therefore, the laser driver module 354a must store the preceding edge positions, as well as wait until receiving the following edge positions, before determining the adjustment of the edge to be written.

Figure 9:
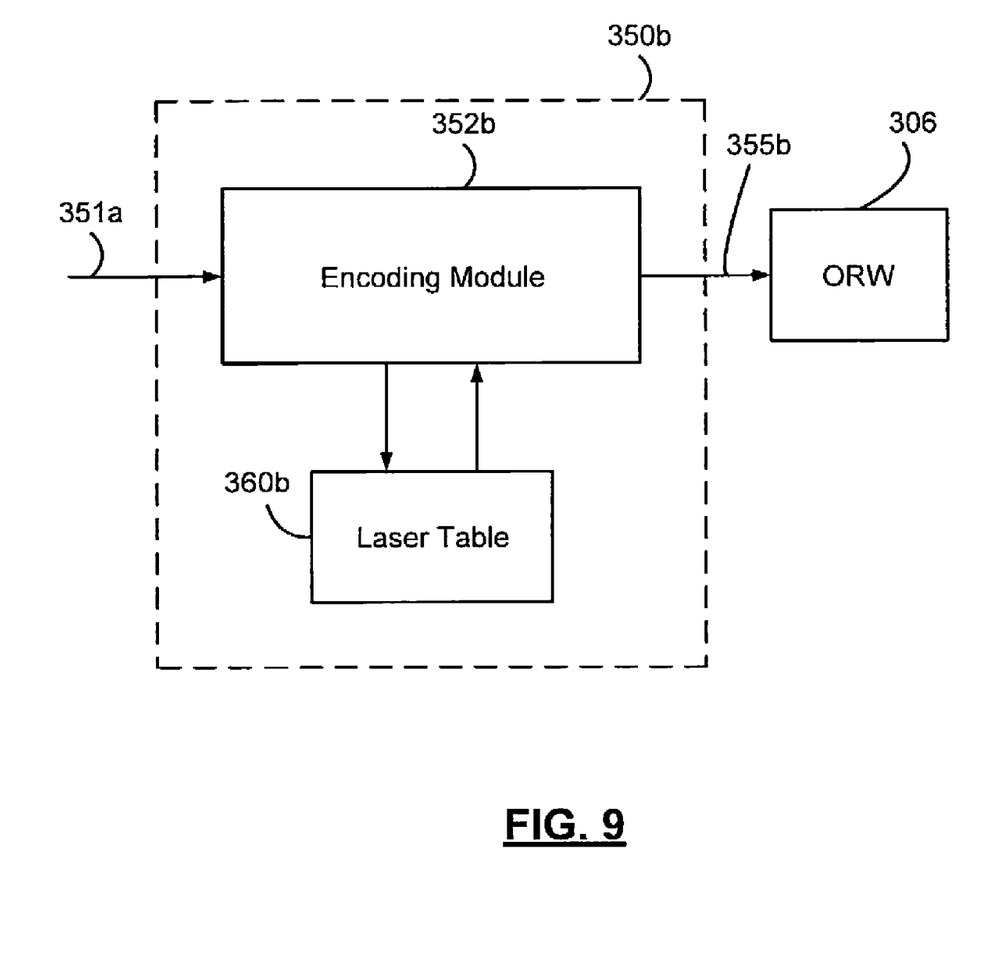
FIG. 9 is a functional block diagram of a write control module according to various embodiments of the present disclosure.

FIG. 9 illustrates an exemplary write control module 350b according to some embodiments of the present disclosure. Write control module 350b comprises encoding module 352b and laser table 360b. Encoding module 352b receives a data stream 351b to be encoded and outputs a series of electrical pulses 355b that are used by ORW 306 to record the data onto the optical storage medium. Instead of splitting the functions of the write control module between an encoding module and laser driver, write control module 350b utilizes one module, i.e., encoding module 352b, to perform both the encoding and conversion functions. Encoding module 352b may utilize a laser table 360b to adjust the position of the edges of the spaces and marks to be written, as described above. Because encoding module 352b generates the encoded data stream, the position of the edges to be written is known and the adjustment of the edge positions, e.g., from laser table 360b, can be determined more easily than laser driver module 354a.

Figure 10:
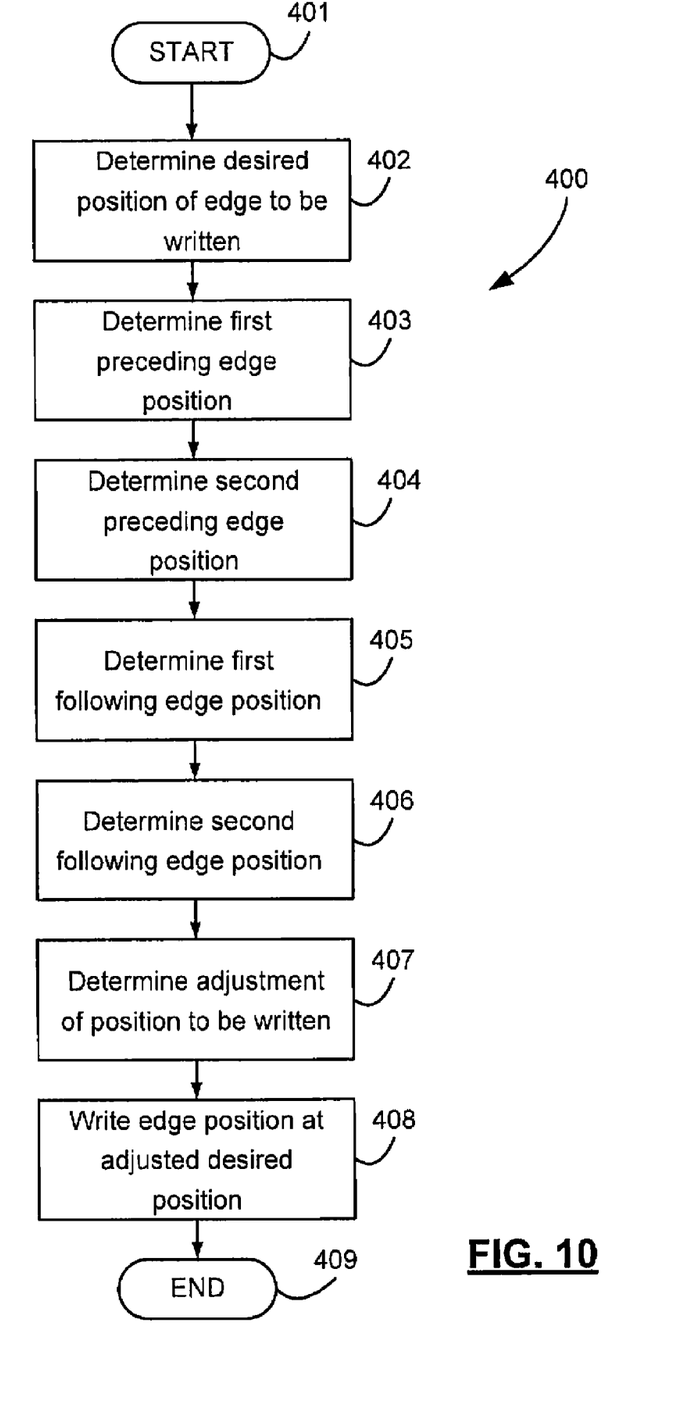
FIG. 10 is a flowchart describing a method of writing to an optical disk according to various embodiments of the present disclosure.

A flowchart describing a method 400 of writing to an optical disk according to some embodiments of the present disclosure is shown in FIG. 10. The method 400 begins at block 401. At block 402, the desired position of the edge to be written is determined. As described more fully above, the desired position of an edge comprises the physical position of the transition between a space and a mark and may correspond to a high or "1" value in the data stream. The position of the edge immediately preceding the edge to be written, otherwise known as the first preceding edge position, is determined at block 403. At block 404, the position of the edge immediately preceding the first preceding edge position, which is otherwise known as the second preceding edge position, is determined. At block 405, the position of the edge in the data stream immediately following the edge to be written, known as the first following edge position, is determined. The position of the edge in the data stream immediately following the first following edge position, known as the second following edge position, is determined at block 406.

An adjustment of the position of the edge to be written, for example, based on the first and second preceding and following edge positions, is determined at block 407. At block 408, the edge to be written is recorded onto the optical storage medium at the desired position adjusted by the adjustment determined at block 407. The method ends at block 409.

The broad teachings of the disclosure can be implemented in a variety of forms. Therefore, while this disclosure includes particular examples, the true scope of the disclosure should not be so limited since other modifications may be applied to the various embodiments upon a study of the drawings, the specification and the following claims. For example, one or more steps of the methods described above can be performed in a different order and still achieve desirable results.

What is claimed is:

1. A system for writing to an optical storage medium, the system comprising:
    an encoding module configured to encode a data stream to generate an encoded data stream; and
    a laser driver module configured to
        convert the encoded data stream into a write signal including one or more edges, wherein the write signal is output to an optical writer, and
        adjust an actual position at which the optical writer writes a first edge of the one or more edges on the optical storage medium away from a desired position for the first edge,
    wherein the adjustment of the actual position at which the optical writer writes the first edge is made based on (i) a first preceding edge position, (ii) a first following edge position, (iii) at least one of a second preceding edge position or a second following edge position, and (iv) at least one of a third preceding edge position or a third following edge position, and
    wherein the first edge corresponds to a beginning of the write signal.

2. The system of claim 1, wherein a sensed position of the first edge on the optical storage medium, as sensed by an optical reader, corresponds to the desired position for the first edge.

3. The system of claim 1, wherein:
    the laser driver module comprises a look-up table configured to store one or more adjustment values; and
    the laser driver module is configured to adjust the actual position using an adjustment value stored in the look-up table.

4. The system of claim 1, wherein the laser driver module is further configured to adjust the actual position that the optical writer writes the first edge on the optical storage medium based on inter-symbol interference of adjacent spaces and marks of the encoded data stream.

5. The system of claim 1, wherein the desired position for the first edge corresponds to a transition point in the encoded data stream.

6. An integrated circuit comprising the system of claim 1.

7. A driver for an optical storage medium, the driver comprising:
 a converting module configured to convert an encoded data stream into a write signal including one or more edges, the write signal being output to an optical writer; and
 an adjustment module configured to adjust an actual position at which the optical writer writes a first edge of the one or more edges on the optical storage medium away from a desired position for the first edge, the adjustment being made based on (i) a first preceding edge position, (ii) a first following edge position, (iii) at least one of a second preceding edge position or a second following edge position, and (iv) at least one of a third preceding edge position or a third following edge position,
 wherein the first edge corresponds to a beginning of the write signal, and
 wherein a sensed position of the first edge on the optical storage medium as sensed by an optical reader corresponds to the desired position for the first edge.

8. The driver of claim 7, wherein:
 the adjustment module comprises a look-up table configured to store one or more adjustment values; and
 the adjustment module is configured to adjust the actual position using an adjustment value stored in the look-up table.

9. The driver of claim 7, wherein the adjustment module is further configured to adjust the actual position that the optical writer writes the first edge on the optical storage medium based on inter-symbol interference of adjacent spaces and marks of the encoded data stream.

10. The driver of claim 7, wherein the desired position for the first edge corresponds to a transition point in the encoded data stream.

11. A method for writing to an optical storage medium, the method comprising:
 encoding a data stream to generate an encoded data stream; and
 converting the encoded data stream into a write signal including one or more edges;
 outputting the write signal to an optical writer; and
 adjusting an actual position at which the optical writer writes a first edge of the one or more edges on the optical storage medium away from a desired position for the first edge,
 wherein the adjustment of the actual position at which the optical writer writes the first edge is made based on (i) a first preceding edge position, (ii) a first following edge position, (iii) at least one of a second preceding edge position or a second following edge position, and (iv) at least one of a third preceding edge position or a third following edge position, and
 wherein the first edge corresponds to a beginning of the write signal.

12. The method of claim 11, wherein a sensed position of the first edge on the optical storage medium, as sensed by an optical reader, corresponds to the desired position for the first edge.

13. The method of claim 11, wherein adjusting the actual position that the optical writer writes the first edge on the optical storage medium comprises using an adjustment value stored in a look-up table.

14. The method of claim 11, wherein adjusting the actual position that the optical writer writes the first edge on the optical storage medium comprises adjusting the actual position based on inter-symbol interference of adjacent spaces and marks of the encoded data stream.

15. The method of claim 11, wherein the desired position for the first edge corresponds to a transition point in the encoded data stream.

16. A method for writing to an optical storage medium, the method comprising:
 converting an encoded data stream into a write signal including one or more edges;
 outputting the write signal to an optical writer; and
 adjusting an actual position at which the optical writer writes a first edge of the one or more edges on the optical storage medium away from a desired position for the first edge,
 the adjustment being made based on (i) a first preceding edge position, (ii) a first following edge position, (iii) at least one of a second preceding edge position or a second following edge position, and (iv) at least one of a third preceding edge position or a third following edge position,
 wherein the first edge corresponds to a beginning of the write signal, and
 wherein a sensed position of the first edge on the optical storage medium as sensed by an optical reader corresponds to the desired position for the first edge.

17. The method of claim 16, wherein the adjustment of the actual position that the optical writer writes the first edge on the optical storage medium is based on an adjustment value stored in a look-up table.

18. The method of claim 16, wherein the adjustment of the actual position that the optical writer writes the first edge on the optical storage medium is based on inter-symbol interference of adjacent spaces and marks of the encoded data stream.

19. The method of claim 16, wherein the desired position for the first edge corresponds to a transition point in the encoded data stream.

* * * * *